United States Patent
Gorges et al.

(10) Patent No.: US 6,685,275 B2
(45) Date of Patent: Feb. 3, 2004

(54) AXLE EXTENSION DEVICE

(76) Inventors: Dave J. Gorges, 609 Wheatland, Colwich, KS (US) 67030; Brian Hall, P.O. Box 418, Ottawa, KS (US) 66528

( * ) Notice: Subject to any disclaimer, the term of this patent is extended or adjusted under 35 U.S.C. 154(b) by 0 days.

(21) Appl. No.: 10/288,170

(22) Filed: Nov. 5, 2002

(65) Prior Publication Data

US 2003/0062761 A1 Apr. 3, 2003

Related U.S. Application Data

(63) Continuation-in-part of application No. 09/884,690, filed on Jun. 19, 2001, now abandoned.

(51) Int. Cl.[7] ............................................. B60B 27/00
(52) U.S. Cl. ............................ 301/35.629; 301/35.621
(58) Field of Search ................... 301/35.621, 35.629, 301/35.631, 111.01, 35.628

(56) References Cited

U.S. PATENT DOCUMENTS

| | | | | |
|---|---|---|---|---|
| 2,779,630 A | * | 1/1957 | Klinker | 301/35.629 |
| 2,970,008 A | * | 1/1961 | Leach | 301/35.629 |
| 3,361,482 A | * | 1/1968 | Stevens | 301/35.261 |
| 3,820,851 A | * | 6/1974 | Longo et al. | 301/35.629 |
| 3,834,766 A | * | 9/1974 | Thousand | 301/35.629 |
| 4,585,276 A | * | 4/1986 | Tirheimer | 301/36.1 |
| 4,718,732 A | * | 1/1988 | Osbourne | 301/36.1 |
| 5,785,391 A | * | 7/1998 | Parry et al. | 301/111.01 |

* cited by examiner

Primary Examiner—Russell D. Stormer
(74) Attorney, Agent, or Firm—Dale J. Ream

(57) ABSTRACT

An axle extension device includes a circular extender plate having a plurality of bores adapted to receive the mounting studs of a vehicle hub therethrough. A number of stud bolts equal to the number of mounting studs extend outwardly from the extender plate for receiving corresponding holes of a hub of a vehicle tire/wheel combination. The extender plate has a thickness such that a tire/wheel combination attached thereto is displaced from the vehicle's wheel hub so the vehicle's wheel base is broadened. Another embodiment includes a first extender plate for mounting to the mounting studs of a vehicle hub, the first extender plate having a threaded exterior side surface. A second extender plate includes a threaded interior surface and may be rotatably mounted to the first extender plate for adjusting the amount of axle extension. The second extender plate includes stud bolts for receiving a tire/wheel combination.

7 Claims, 7 Drawing Sheets

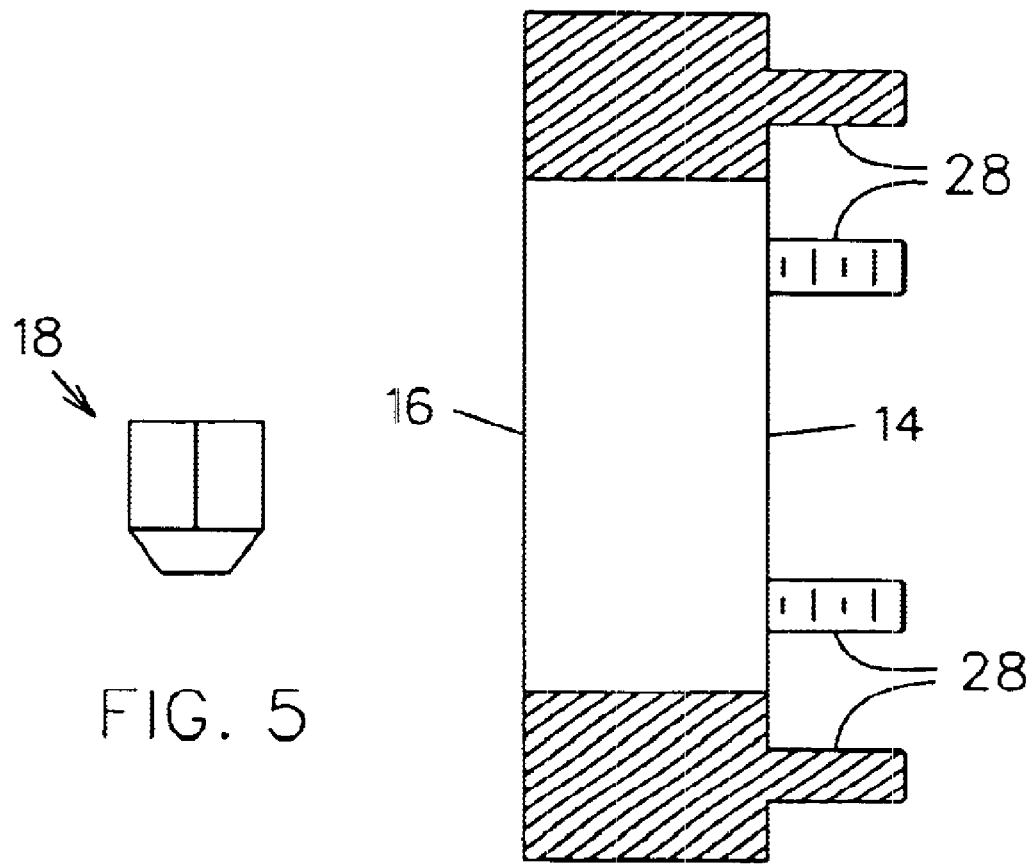

AXLE EXTENSION DEVICE

REFERENCE TO RELATED APPLICATIONS

This application is a continuation-in-part of application Ser. No. 09/884,690 filed on Jun. 19, 2001 (now abandoned) incorporated herein.

BACKGROUND OF THE INVENTION

This invention relates generally to wheel mounting devices and, more particularly, to an axle extension device which broadens the wheel base of a vehicle and enables the original tires and wheels to be mounted thereto.

Various devices have been proposed in the art for adapting a vehicle wheel hub to receive a wheel thereon having a bolt pattern different from that of the vehicle wheel hub itself. For example, a wheel adapter may allow a vehicle owner to exchange a five-bolt, four inch bolt circle wheel for a five-bolt, five inch bolt circle wheel. Or, another properly configured adapter may allow a vehicle owner to exchange a five-bolt wheel for an eight-bolt wheel, etc. Although assumably effective for their intended purposes, the existing devices do not provide a means for conveniently extending the length of an axle while still enabling the axle to receive conventional vehicle wheels thereon and, therefore, to extend the wheel base of the vehicle.

Therefore, it is desirable to have an axle extension device which may be coupled to a vehicle wheel hub for extending the corresponding axle and widening the wheel base of the vehicle. Further, it is desirable to have an axle extension device that allows the vehicle's stock wheels to be mounted thereto. In addition, it is desirable to have an axle extension device which allows a user to easily select or adjust the extent to which the axle is extended.

SUMMARY OF THE INVENTION

An axle extension device according to the present invention includes a circular axle extender plate defining a plurality of bores therethrough arranged in a bolt circle and adapted to respectively receive the mounting studs of a vehicle wheel hub therethrough. A plurality of nuts having threads complementary to those of the mounting studs may be used to secure the extender plate to the vehicle wheel hub. The extender plate further includes a plurality of stud bolts arranged in a bolt circle with each stud bolt positioned between a pair of extender plate bores. The stud bolts are constructed in a manner substantially similar to the mounting studs of the vehicle wheel hub in that the hub of a vehicle wheel may be received thereon and secured thereto with conventional lug nuts. The extender plate presents a thickness such that a wheel attached thereto is offset about ½" to 3 inches from the actual vehicle wheel hub.

Therefore, a general object of the present invention is to provide an axle extension device which increases the wheel base of a vehicle.

Another object of this invention is to provide an axle extension device, as aforesaid, which allows wheels having the same bolt configuration as the vehicle wheel hub to be mounted to the extender plate.

Still another object of this invention is to provide an axle extension device, as aforesaid, having a predetermined thickness such that a wheel mounted thereto is offset a corresponding distance from the vehicle wheel hub.

A further object of this invention is to provide an axle extension device, as aforesaid, which improves vehicle handling and control when driving along curves and corners.

A still further object of this invention is to provide an axle extension device, as aforesaid, which provides an aesthetically pleasing custom appearance to tires and wheels mounted thereto.

Another object of this invention is to provide an axle extension device, as aforesaid, which may be easily adjusted by a user to selectively vary the extent to which an axle is broadened.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 5 is a side view of a nut as in FIG. 1 on an enlarged scale;

FIG. 6 is a sectional view of the extension device taken along line 6—6 of FIG. 2;

DESCRIPTION OF THE PREFERRED EMBODIMENT

Figure 1:
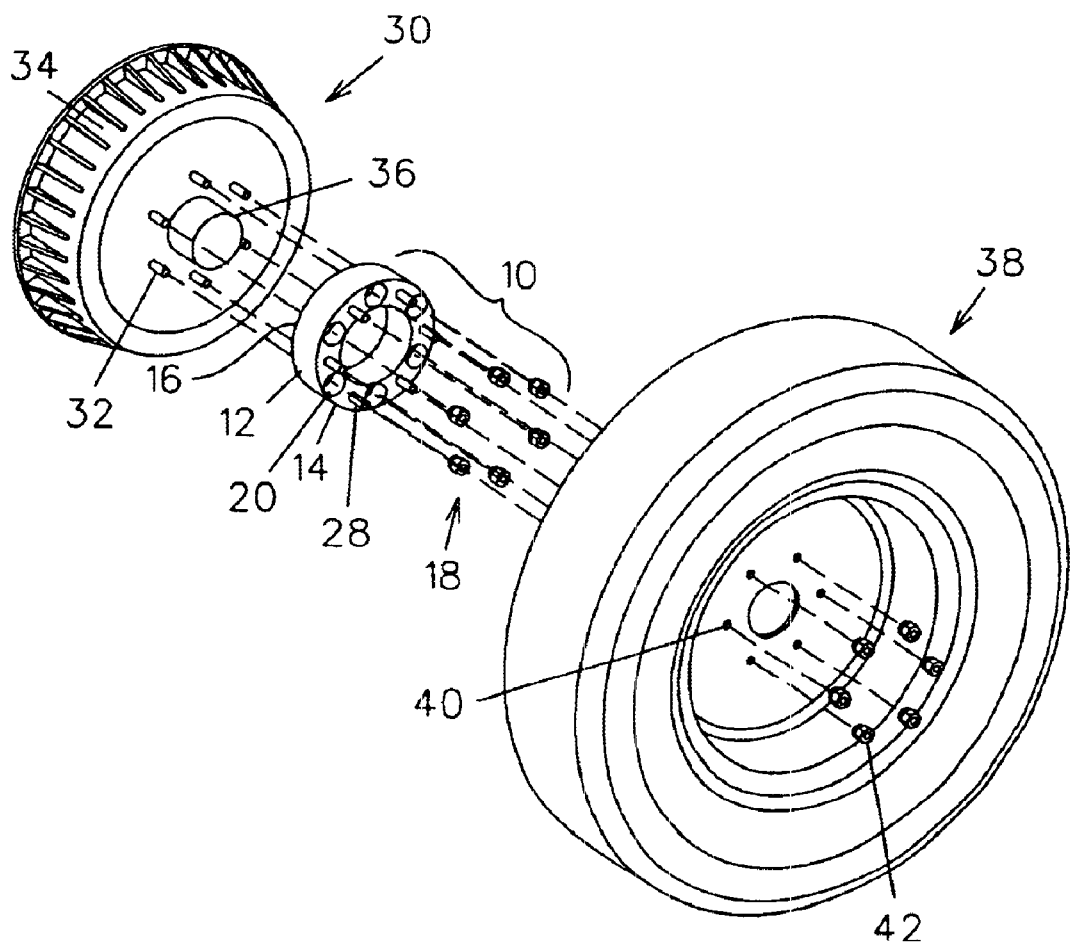
FIG. 1 is an exploded perspective view of an axle extension device according to an embodiment of the present invention mounted to a vehicle wheel hub.
Figure 2:
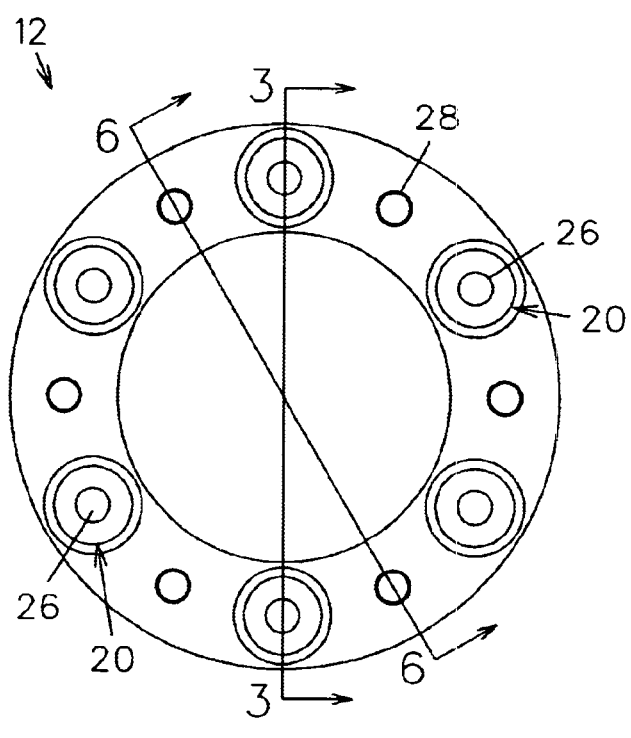
FIG. 2 is a front view of the extension device as in FIG. 1.
Figure 3:
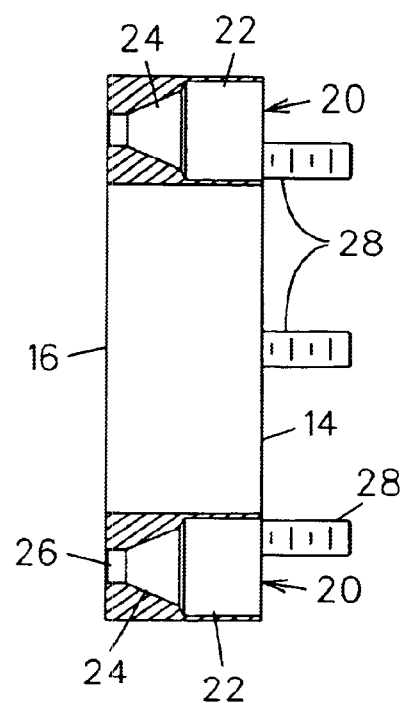
FIG. 3 is a sectional view of the extension device taken along line 3—3 of FIG. 2.
Figure 4:
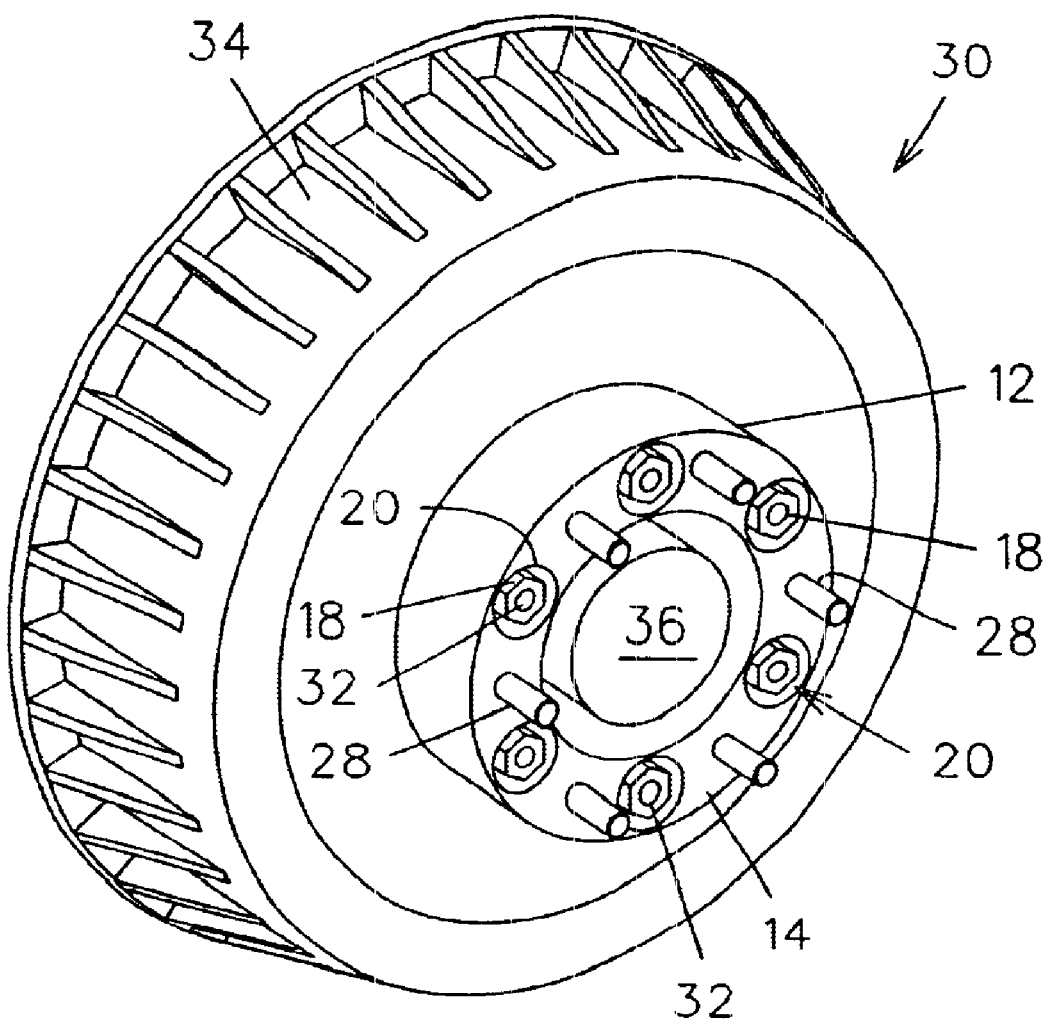
FIG. 4 is a perspective view of the extension device as in FIG. 1 mounted to a vehicle wheel hub.

An axle extension device 10 according to one embodiment of the present invention will now be described in detail with reference to FIGS. 1 through 6 of the accompanying drawings. The axle extension device 10 includes an extender plate 12 having a circular configuration with a first (front) side 14 and a second (back) side 16 (FIG. 1). The extender plate 12 defines a cylindrically-shaped open center having a diameter large enough that the plate may be received on the axle 36 of a motor vehicle (FIG. 4). The extender plate 12 further defines a plurality of bores 20 extending between first 14 and second 16 sides and arranged in a bolt circle.

The extender plate 12 is configured to be mounted to a vehicle wheel hub 30. A conventional vehicle wheel hub 30 includes a plurality of threaded mounting studs 32 extending outwardly from a brake drum 34 or disk brake assembly and arranged in a bolt circle, the brake drum being mounted to a corresponding axle 36 for rotation therewith (FIGS. 1 and 3). In the present invention, each extender plate 12 is preferably constructed for use with a particular model of vehicle having a particular wheel hub configuration. The diameter, number, and configuration of the bolt circle of extender plate bores 20 is equal to the diameter, number, and configuration of mounting studs 32 of a corresponding vehicle wheel hub 30 such that the mounting studs 32 may be respectively received through the extender plate bores 20 (FIG. 1). A plurality of nuts 18 having threads complementary to respective mounting studs 32 may be threadably coupled to ends thereof for securing the extender plate 12 to the vehicle wheel hub 30 (FIG. 4).

Each bore 20 through the extender plate 12 has a generally cylindrical configuration that is divided into two portions (FIG. 3). A first portion 22 defines a cylindrical recess that is open at the first side 14 of the extender plate 12. The first portion 22 includes a diameter larger than that of a mounting stud nut 18 such that a socket wrench (stock or impact) may be used to tighten the nut 18 and so the nut is completely recessed beneath the first side 14 when fully tightened (FIG. 4). A second portion 24 defines an opening 26 at the second side 16 having a diameter sufficient to receive a mounting stud 32 therethrough. The second portion 24 includes a configuration that is tapered between the opening 26 at the second side and the first portion 22 of the bore. The tapered configuration allows the beveled end of a nut 18 to nest therein. The first 22 and second 24 portions are in communication with one another such that a mounting stud 32 may be received therethrough. This bore configuration is preferably accomplished in a conventional counter-drilling manner.

A plurality of stud bolts 28 are integrally attached to the first side 14 of each extender plate 12 and extend outwardly therefrom (FIGS. 3, 4 and 6). The stud bolts 28 are arranged in a bolt circle configuration with each stud bolt 28 being positioned intermediate a respective pair of extender plate bores 20 (FIG. 2). Therefore, the diameter of the bolt circle of bores is equal to the bolt circle of stud bolts as they actually form a unitary bolt circle. This is because a vehicle wheel configured to be mounted to the vehicle wheel hub 30 is capable of being mounted to the stud bolts 28 of the extender plate 12. The stud bolts 28 are constructed in a manner substantially similar to the corresponding mounting studs 32 so as to be selectably received through the holes 40 of a hub of a vehicle wheel 38. The vehicle wheel may also be referred to as a tire/wheel combination. Conventional lug nuts 42 associated with the vehicle wheel 38 may be threadably coupled to the stud bolts 28 to secure the vehicle wheel 38 to the extender plate 12.

In use, the wheel base of a vehicle may be extended or widened by mounting an axle extension device 10 to each end of a vehicle axle 36. Thus, the axle 36 is effectively lengthened along an imaginary longitudinal axis established by a respective elongate axle 36. This may be accomplished by orienting the plurality of bores 20 of an appropriately constructed extender plate 12 with the plurality of mounting studs 32 of a vehicle wheel hub 30 and positioning the plate such that the mounting studs 32 are received through respective bores 20 (FIG. 1). The plurality of nuts 18 may then be threadably coupled to the mounting studs 32 to secure the extender plate 12 to the vehicle wheel hub 30. In like manner, the hub of a tire/wheel combination may be oriented such that the holes therein may respectively mate with the stud bolts 28 of the extender plate 12. Conventional lug nuts 42 may then be threadably coupled to the ends of the stud bolts 28 to secure the tire/wheel combination to the extender plate 12. Depending on the thickness of the particular extender plate 12, the wheel base of the vehicle may be extended by ½" to 3" or more at each end of an axle.

It is understood that an axle extension device 10 according to the present invention may be manufactured in various dimensions so as to be useful not only with automobiles, but also with all-terrain vehicles, dune buggies, racing vehicles, trailers, and the like. Further, it is preferred that the extender plate 12 utilize the same bolt and hole pattern of the particular vehicle wheel hub such that it is unnecessary for the vehicle owner to purchase a different tire and wheel than the one originally mounted to the vehicle hub.

Figure 7:
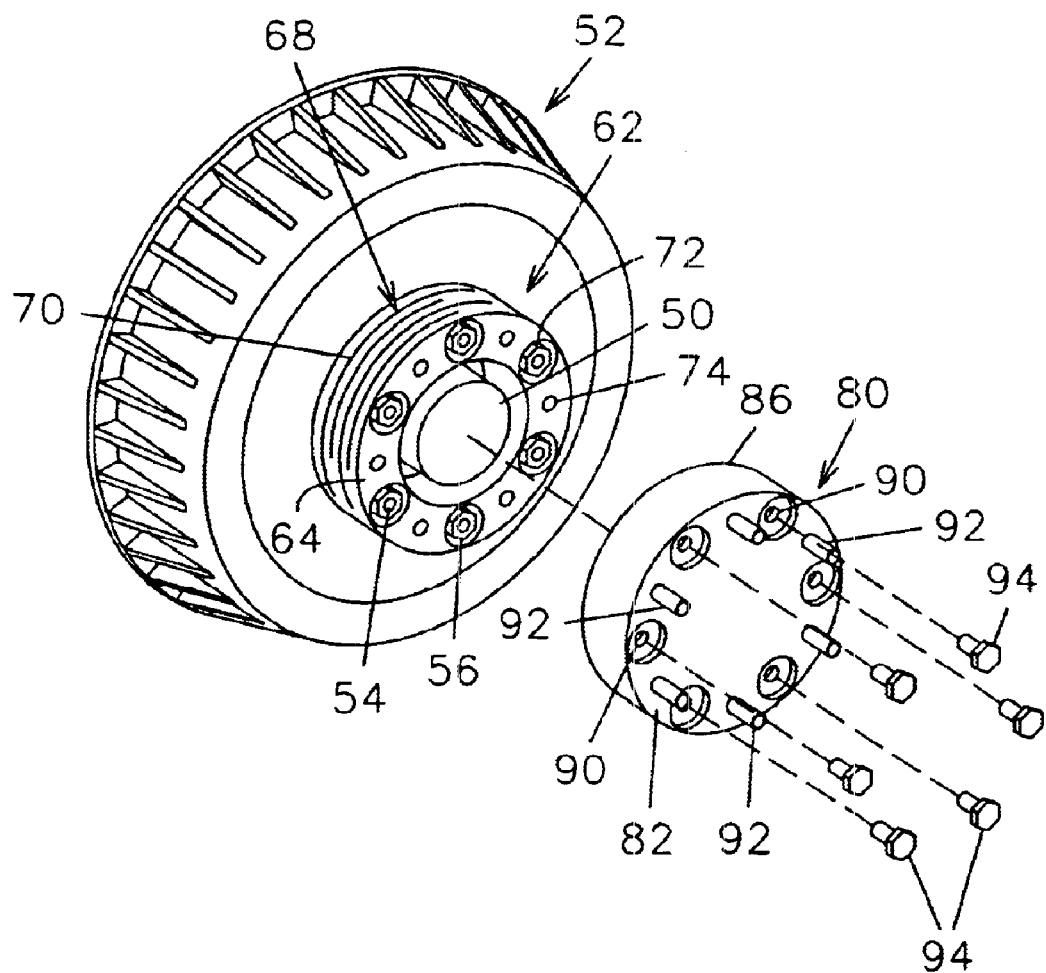
FIG. 7 is an exploded perspective view of an axle extension device according to another embodiment of the present invention mounted to a vehicle hub.
Figure 8:
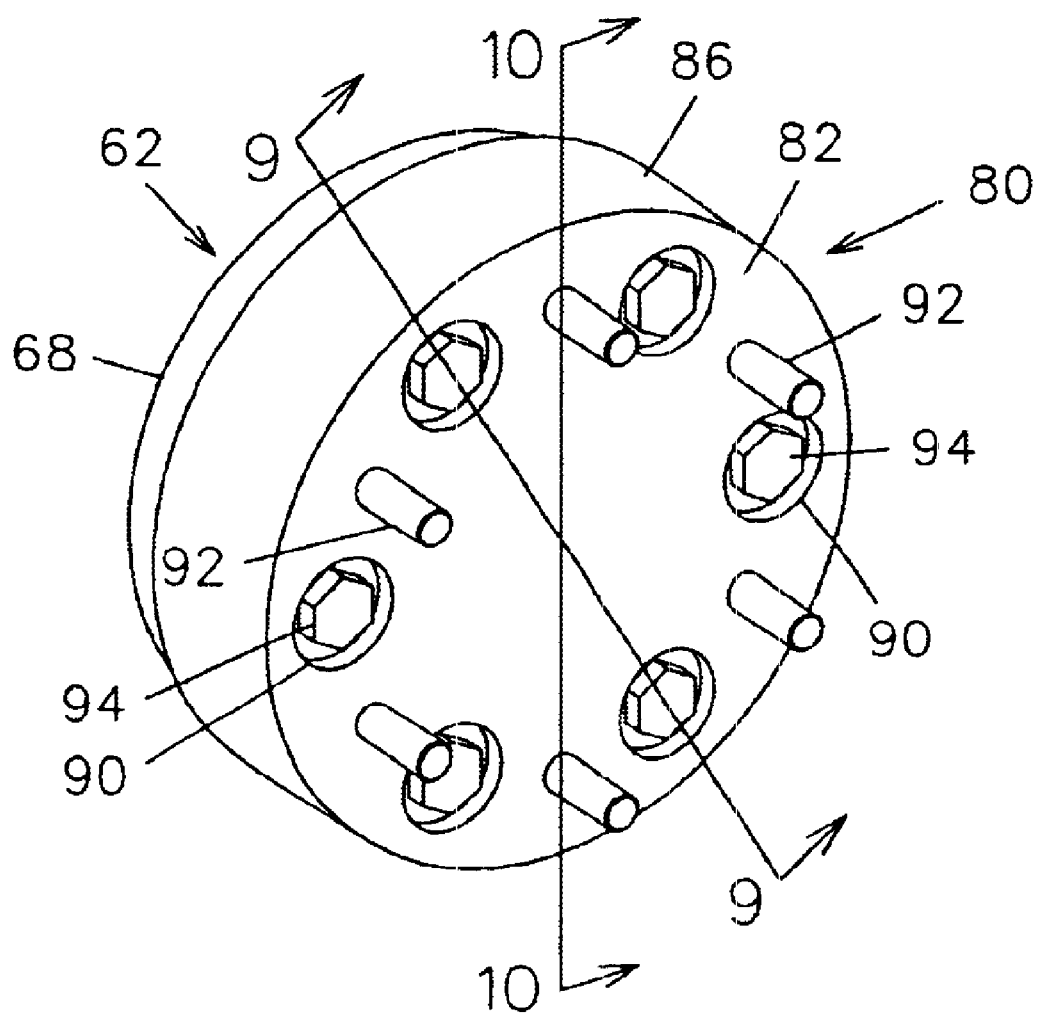
FIG. 8 is another perspective view of the extension device as in FIG. 7 removed from the vehicle hub.

An axle extension device 60 according to another embodiment of this invention is shown in FIGS. 7 through 10. The extension device 60 according to this embodiment includes first 62 and second 80 extender plates that may be selectively adjusted by a user to vary the extent to which an axle is lengthened, as will be described in detail below. A first extender plate 62 includes a circular configuration having a construction substantially similar to a construction of the extender plate 12 described previously except as specifically noted below. More particularly, the first extender plate 62 includes a circular configuration with front 64 and rear 66 planar surfaces. A continuous side wall 68 extends between peripheral edges of the front 64 and rear 66 planar surfaces. The first extender plate 62 defines a cylindrically-shaped open center having a diameter large enough that the plate may be received on the axle 50 of a vehicle. An exterior surface 70 of the side wall 68 includes a threaded configuration (FIG. 7). The first extender plate 62 defines a plurality of first bores 72 arranged in a bolt circle for receiving respective mounting studs 54 of a vehicle wheel hub in the same manner described previously. A plurality of nuts 56 having threads complementary to respective mounting studs 54 may be threadably coupled to ends thereof for securing the first extender plate 62 to the vehicle wheel hub 52 (FIG. 7). In addition, the front planar surface 64 of the first extender plate 62 defines a plurality of first holes 74 situated between the plurality of first bores 72 such that the bores and holes form a unitary bolt pattern (FIG. 7).

Figure 9:
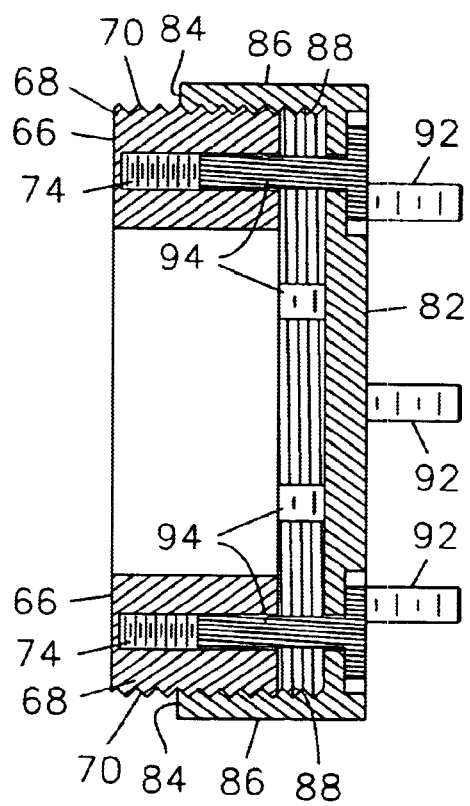
FIG. 9 is a sectional view of the extension device taken along line 9—9 of FIG. 8.
Figure 10:
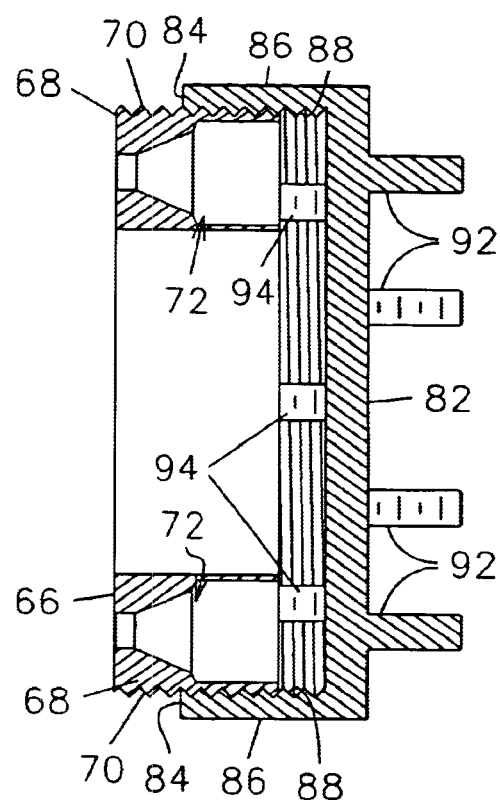
FIG. 10 is a sectional view of the extension device taken along line 10—10 of FIG. 8.

The second extender plate 80 also includes front 82 and rear 84 planar surfaces with a continuous side wall 86 extending between respective peripheral edges of the planar surfaces. While the rear planar surface 84 of the second extender plate 80 defines an cylindrically-shaped open center for receiving the first extender plate 62 therein, the front planar surface 82 is suitable without a central opening (FIG. 7). The side wall 86 of the second extender plate 80 includes a threaded inner surface (FIGS. 9 and 10). It is understood that the side wall 86 of the second extender plate 80 includes an inner diameter that is complementary to an outer diameter of the first extender plate 62.

The second extender plate 80 defines a plurality of second holes 90 extending through the side wall 86 between the front 82 and rear 84 planar surfaces thereof. The plurality of second holes 90 are arranged in a bolt circle having a diameter equal to a diameter of the bolt circle of the first holes 74 in the first extender plate 62. The device 60 further includes a plurality of locking bolts 94 (FIG. 7) that may be extended through the first and second holes when appropriately aligned. This allows the first 62 and second 80 extender plates to be releasably coupled at a desired configuration.

A plurality of stud bolts 92 are integrally attached to the front planar surface 82 of the second extender plate 80 and extend outwardly therefrom, said stud bolts being situated between respective second holes 90 in a unitary bolt circle. The stud bolts 92 are arranged in a bolt circle having a configuration and diameter corresponding to the configuration of the vehicle mounting studs 54 such that a tire/wheel combination may be mounted thereto in the manner described previously.

In use, the first extender plate 62 may be mounted to the end of a vehicle axle 50 by aligning the mounting studs 54 of a vehicle hub 52 with the plurality of first bores 72 of the first extender plate 62. (FIG. 7). The first extender plate 62 may be secured thereto using a respective plurality of nuts 56. The second extender plate 80 may then be rotatably coupled to the first extender plate 62 by engaging the interior threaded surface of the second extender plate 80 with the exterior threaded surface 70 of the first extender plate 62. As the second extender plate 80 is rotated in a clockwise direction, the space/displacement between the front planar surfaces 64, 82 of the first 62 and second 80 extender plates is decreased. Clearly, as this distance is decreased, the extent to which the axle is broadened is correspondingly decreased, or vice versa. When a desired displacement is substantially achieved, the plurality of first 74 and second 90 holes are aligned as the second extender plate 80 is gradually rotated. Upon alignment, the plurality of locking bolts 94 may be inserted therethrough and tightened so as to hold the extender plates in the desired configuration.

Therefore, it can be seen that this embodiment enables a user to selectively set or adjust the overall length of the axle. Such an adjustment is quick, convenient, and makes the present invention useful in many more circumstances, such as for modifying the aesthetic appearance of a customized vehicle or simply for providing an optimal wheel base that is safer or more efficient.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. An axle extension device for broadening the wheel base of a vehicle having a plurality of wheel mounting studs arranged in a bolt circle on a vehicle wheel hub, said axle extension device comprising:
    a circular extender plate having first and second sides and defining a plurality of bores therebetween, said bores being spaced apart and arranged in a bolt circle and adapted to respectively receive said plurality of mounting studs therethrough;
    a plurality of nuts adapted to threadably mate with said plurality of wheel mounting studs when said wheel mounting studs are respectively received through said plurality of bores;
    wherein each bore includes a cylindrical configuration and comprises:
        a first portion defining an open end at said first side of said extender plate for receiving a respective nut therein, said first portion having a diameter larger than a diameter of a respective nut;
        a second portion having an open end at said second side of said adapter having a diameter smaller than a diameter of said first portion open end, said second portion end being in communication with said first portion, said second portion having a configuration that is tapered to receive a respective beveled end of a respective nut in said first portion, whereby to completely seat said respective nut in said first portion;
    wherein said extender plate includes a monolithic construction forming a plurality of stud bolts extending from said first side of said extender plate and arranged in a bolt circle and equally spaced apart between respective bores, said plurality of stud bolts adapted to extend through respective holes of a hub of a tire/wheel combination; and
    wherein a diameter of said bolt circle of said mounting studs is equal to a diameter of said bolt circle of said stud bolts, whereby a tire/wheel combination adapted to be mounted to a vehicle hub is adapted to be selectably mounted to said extender plate without adaptation.

2. An axle extension device for selectively broadening the wheel base of a vehicle having a plurality of wheel mounting studs arranged in a bolt circle on a vehicle wheel hub, said axle extension device comprising:
    a first extender plate having a circular configuration and defining a plurality of first bores arranged in a bolt circle for receiving respective wheel mounting studs therethrough, said first extender plate having a continuous first plate side wall with a threaded exterior surface;
    wherein said first extender plate defines a plurality of first holes situated between respective first bores;
    a plurality of nuts adapted to threadably mate with said plurality of wheel mounting studs when said wheel mounting studs are respectively received though said plurality of first bores;
    a second extender plate having a circular configuration with a continuous second plate side wall, said second plate side wall having a planar front surface defining a plurality of second holes arranged in a bolt circle, said second plate side wall having a threaded interior surface for rotatably engaging said threaded exterior surface of said first extender plate, whereby to selectively align said plurality of second holes and said plurality of first holes;
    a plurality of stud bolts arranged in a bolt circle on said second plate planar surface and adapted to extend through respective holes of a hub of a tire/wheel combination, each stud bolt being positioned intermediate a pair of respective second holes such that said plurality of stud bolts and said plurality of second holes are arranged in a unitary bolt circle; and
    a plurality of locking bolts adapted to extend through corresponding first and second holes when said first and second holes are aligned, whereby to maintain said first and second extender plates at a selected configuration.

3. The device as in claim 2, wherein:
    said plurality of stud bolts and said plurality of mounting studs comprise the same number of bolts and studs, respectively, whereby a tire/wheel combination adapted to be mounted to a vehicle hub is also adapted to be selectably mounted to said second extender plate without adaptation; and
    wherein a diameter of said bolt circle of said mounting studs is equal to a diameter of said bolt circle of said stud bolts, whereby a tire/wheel combination adapted to be mounted to a vehicle hub is also adapted to be selectively mounted to said second extender plate without adaptation.

4. The device as in claim 2 wherein said plurality of stud bolts are adapted to mate with a plurality of lug nuts associated with said tire/wheel combination when said plurality of stud bolts are respectively received through a plurality of holes in said hub of said tire/wheel combination so as to securely mount said tire/wheel combination to said second extender plate.

5. An axle extension device for selectively broadening the wheel base of a vehicle having a plurality of wheel mounting studs arranged in a bolt circle on a vehicle wheel hub, said axle extension device comprising:
    a first extender plate having first plate front and rear planar surfaces with a continuous first plate side wall extending between respective peripheral edges of said first plate front and rear planar surfaces, said first plate side wall having a threaded exterior surface;

said first extender plate having a circular configuration and defining a plurality of first bores extending through said first plate side wall between said first plate front and rear planar surfaces and arranged in a bolt circle for receiving respective wheel mounting studs therethrough;

wherein said first plate front planar surface defines a plurality of first holes situated between respective first bores;

a second extender plate having second plate front and rear planar surfaces with a continuous second plate side wall extending between respective peripheral edges of said second plate front and rear planar surfaces, said second extender plate having a circular configuration and defining a plurality of second holes arranged in a bolt circle, said second plate side wall having a threaded interior surface for rotatably engaging said threaded exterior surface of said first plate side wall, whereby to selectively align said plurality of second holes and said plurality of first holes at a selected displacement between said front planar surface of said first extender plate and said front planar surface of said second extender plate;

a plurality of stud bolts arranged in a bolt circle on said second plate front planar surface and adapted to extend through respective holes of a hub of a tire/wheel combination, each stud bolt being positioned intermediate a pair of respective second holes such that said plurality of stud bolts and said plurality of second boles are arranged in a unitary bolt circle; and a plurality of locking bolts adapted to extend trough corresponding first and second holes when said first and second holes are aligned, whereby to maintain said first and second extender plates at said selected displacement.

6. The device as in claim 5 wherein:

said plurality of stud bolts on said second plate front planar surface and said plurality of mounting studs comprise the same number of bolts and studs, respectively, whereby a tire/wheel combination adapted to be mounted to a vehicle hub is also adapted to be selectably mounted to said second extender plate without adaptation; and wherein a diameter of said bolt circle of said mounting studs is equal to a diameter of said bolt circle of said stud bolts, whereby a tire/wheel combination adapted to be mounted to a vehicle hub is also adapted to be selectively mounted to said second extender plate without adaptation.

7. The device as in claim 5 wherein said plurality of stud bolts are adapted to mate with a plurality of lug nuts associated with said tire/wheel combination when said plurality of stud bolts are respectively received through a plurality of holes in said hub of said tire/wheel combination so as to securely mount said tire/wheel combination to said second extender plate.

* * * * *